United States Patent
Kameyama

(10) Patent No.: US 7,343,234 B2
(45) Date of Patent: Mar. 11, 2008

(54) VEHICLE CONTROL UNIT AND VEHICLE CONTROL SYSTEM HAVING THE SAME

(75) Inventor: Shogo Kameyama, Chiryu (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 11/146,108

(22) Filed: Jun. 7, 2005

(65) Prior Publication Data
US 2005/0278093 A1    Dec. 15, 2005

(30) Foreign Application Priority Data
Jun. 10, 2004    (JP)    ............... 2004-172242

(51) Int. Cl.
*G06F 17/00*    (2006.01)
(52) U.S. Cl. ............... 701/36; 701/45; 701/49; 340/5.62; 340/457.1; 340/425.5; 340/5.53
(58) Field of Classification Search ................. 701/36, 701/49, 45; 340/5.62, 457.1, 425.5, 5.53
See application file for complete search history.

(56) References Cited

U.S. PATENT DOCUMENTS

| | | | | |
|---|---|---|---|---|
| 4,797,824 A | * | 1/1989 | Sugiyama et al. | ............... 701/49 |
| 5,008,946 A | * | 4/1991 | Ando | ............... 382/104 |
| 5,081,586 A | * | 1/1992 | Barthel et al. | ............... 701/49 |
| 5,969,969 A | * | 10/1999 | Ejiri et al. | ............... 701/41 |
| 5,983,147 A | * | 11/1999 | Krumm | ............... 701/45 |
| 6,034,617 A | * | 3/2000 | Luebke et al. | ............... 340/5.62 |
| 6,138,068 A | * | 10/2000 | Liu | ............... 701/49 |
| 6,243,635 B1 | * | 6/2001 | Swan et al. | ............... 701/49 |
| 6,356,854 B1 | * | 3/2002 | Schubert et al. | ............... 702/150 |
| 6,434,450 B1 | * | 8/2002 | Griffin et al. | ............... 701/1 |
| 6,442,465 B2 | * | 8/2002 | Breed et al. | ............... 701/45 |
| 6,445,988 B1 | * | 9/2002 | Breed et al. | ............... 701/45 |
| 6,614,344 B1 | * | 9/2003 | Frasher et al. | ............... 340/425.5 |
| 6,631,316 B2 | * | 10/2003 | Stam et al. | ............... 701/36 |
| 6,668,221 B2 | * | 12/2003 | Harter et al. | ............... 701/36 |
| 6,707,387 B2 | * | 3/2004 | Noguchi et al. | ............... 340/691.6 |
| 6,799,103 B2 | * | 9/2004 | Toda et al. | ............... 701/36 |
| 6,819,990 B2 | * | 11/2004 | Ichinose | ............... 701/36 |
| 6,842,677 B2 | * | 1/2005 | Pathare | ............... 701/36 |
| 6,993,423 B2 | * | 1/2006 | Inman et al. | ............... 701/49 |
| 7,136,734 B2 | * | 11/2006 | Durach et al. | ............... 701/49 |
| 7,239,947 B2 | * | 7/2007 | Suzuki | ............... 701/36 |
| 2003/0220725 A1 | * | 11/2003 | Harter et al. | ............... 701/36 |
| 2005/0253684 A1 | * | 11/2005 | Kumazaki et al. | ............... 340/5.62 |
| 2005/0278093 A1 | * | 12/2005 | Kameyama | ............... 701/36 |
| 2006/0186996 A1 | * | 8/2006 | Sato | ............... 340/10.2 |
| 2007/0057781 A1 | * | 3/2007 | Breed | ............... 340/457.1 |

FOREIGN PATENT DOCUMENTS

JP    A-2002-114118    4/2002

* cited by examiner

*Primary Examiner*—Thomas Black
*Assistant Examiner*—Wae Lenny Louie
(74) *Attorney, Agent, or Firm*—Posz Law Group, PLC

(57) ABSTRACT

A vehicle control system has a detection section, a vehicle control unit, and a function section. The vehicle control unit has a memory section, a user condition determination section, a intention determination section, a function selection section, and a function control section. The user condition determination section determines movements and conditions of a user based on outputs of the detection section. The intention determination section determines intentions of the user based on results of the user condition determination performed by the user condition determination section and intention map data read from the memory section. The function selection section selects a function from a function section that includes multiple functions based on a result of the intention determination.

17 Claims, 5 Drawing Sheets

FIG. 3A

| | | | INTENTION | | | | | | |
|---|---|---|---|---|---|---|---|---|---|
| | | | UNLOCK | OPENING DOOR | GETTING IN | DRIVING | LOADING/ UNLOADING | SETTING ALARM | ADJUSTING ROOM CONDITION |
| OPERATION | PURPOSE | GETTING IN | 5 | 5 | 5 | 1 | 1 | 1 | 1 |
| | | MOVING VEHICLE | 5 | 5 | 5 | 5 | 1 | 1 | 1 |
| | | SETTING ALARM | 1 | 1 | 1 | 1 | 1 | 5 | 1 |
| | FUNCTION | OPENING DOOR | 5 | 5 | 1 | 1 | 1 | 1 | 1 |
| | | UNLOCK | 5 | 1 | 1 | 1 | 1 | 1 | 1 |

FIG. 3B

| | | INTENTION | | | | | | |
|---|---|---|---|---|---|---|---|---|
| | | UNLOCK | OPENING DOOR | GETTING IN | DRIVING | LOADING/ UNLOADING | SETTING ALARM | ADJUSTING ROOM CONDITION |
| MOVEMENT | APPROACHING FROM FRONT | 4 | 4 | 4 | 4 | 2 | 1 | 1 |
| | APPROACHING FROM REAR | 4 | 4 | 4 | 3 | 4 | 1 | 1 |
| | BRINGING THING(S) | 4 | 3 | 4 | 1 | 5 | 1 | 1 |
| | GETTING OUT | 1 | 1 | 1 | 1 | 1 | 5 | 1 |

FIG. 3C

| | | INTENTION | | | | | | |
|---|---|---|---|---|---|---|---|---|
| | | UNLOCK | OPENING DOOR | GETTING IN | DRIVING | LOADING/ UNLOADING | SETTING ALARM | ADJUSTING ROOM CONDITION |
| GESTURE | LOOKING AT DOOR | 3 | 3 | 2 | 1 | 1 | 1 | 1 |
| | LOOKING AT THING | 3 | 3 | 2 | 1 | 3 | 1 | 1 |
| | REACHING FOR DOOR | 3 | 2 | 2 | 1 | 4 | 1 | 1 |

FIG. 3D

| | | INTENTION | | | | | | |
|---|---|---|---|---|---|---|---|---|
| | | UNLOCK | OPENING DOOR | GETTING IN | DRIVING | LOADING/ UNLOADING | SETTING ALARM | ADJUSTING ROOM CONDITION |
| CONDITION | HEALTHY | 1 | 1 | 1 | 1 | 1 | 1 | 1 |
| | GOOD MOOD | 1 | 1 | 1 | 1 | 1 | 1 | 4 |
| | HAPPY | 1 | 1 | 1 | 1 | 1 | 1 | 4 |
| | BAD | 1 | 1 | 1 | 1 | 1 | 1 | 4 |

FIG. 4

| | | FUNCTION | | | | | | | |
|---|---|---|---|---|---|---|---|---|---|
| | | LIGHT (ILLUMINATION) | WIPER | WINDOW | DOOR | DOOR LOCK | A/C | AUDIO | SEAT |
| INTENTION | UNLOCK | 1 | 1 | 1 | 1 | 5 | 1 | 1 | 1 |
| | OPENING DOOR | 1 | 1 | 1 | 5 | 5 | 1 | 1 | 1 |
| | GETTING IN | 4 | 1 | 1 | 4 | 4 | 3 | 4 | 4 |
| | DRIVING | 1 | 1 | 1 | 1 | 3 | 1 | 1 | 1 |
| | LOADING/ UNLOADING | 4 | 1 | 4 | 4 | 4 | 1 | 1 | 1 |
| | ADJUSTING ROOM CONDITION | 1 | 1 | 5 | 1 | 1 | 5 | 5 | 1 |
| | SETTING ALARM | 1 | 1 | 1 | 1 | 5 | 1 | 1 | 1 |

# VEHICLE CONTROL UNIT AND VEHICLE CONTROL SYSTEM HAVING THE SAME

CROSS REFERENCE TO RELATED APPLICATION

This application is based on and incorporates herein by reference Japanese Patent Application No. 2004-172242 filed on Jun. 10, 2004.

FIELD OF THE INVENTION

The present invention relates to a vehicle control unit and a vehicle control system having the vehicle control unit.

BACKGROUND OF THE INVENTION

Systems for controlling operation of a vehicle based on user's intention of operation are in practical use. In such systems, user's intention is determined based on variations in accelerator pedal positions and brake pedal positions, and operation of a vehicle is performed based on the determined user's intention. An example of such a system is proposed in JP-A-2002-114118. In this system, user's intention of braking is determined based on whether the user steps on a brake pedal. User's intention of acceleration is determined based on whether the user increases pressure on an accelerator pedal, and user's intention of deceleration is determined based on whether the user releases the accelerator pedal. With this configuration, the control of the vehicle operation is automatically adjusted without annoying the user.

More and more functions may become available in vehicles for users' convenience. However, users may have more loads for using the functions and the operability of the vehicles may decrease. This declines the benefit of having advanced functions in the vehicles. For example, a user needs to perform some kind of operation in order to get the functions work in the above-described system. To determine user's intention of braking, acceleration or deceleration, user's operation of the braking pedal or the acceleration pedal is required. Therefore, the operability of the vehicle may decrease as the number of functions increases.

SUMMARY OF THE INVENTION

The present invention therefore has an objective to provide a vehicle control unit capable of controlling a number of functions installed in a vehicle without decreasing the operability of the vehicle. A vehicle control unit of the present invention includes a memory section, a user condition determination section, an intention determination section, a function control section, and a function selection section.

The memory section stores the first data that indicates a correlation between a movement and a condition of a user and an intention of the user. The user condition determination section determines a movement and a condition of the user based on a result of movement and condition detection performed by user detection device. The intention determination section determines an intention of the user based on the first data and the result of the movement and condition determination.

The function control section controls functions that are installed in a vehicle. The functions include functions related to driving the vehicle, such as moving, braking, and turning the vehicle, and functions related to onboard devices, such as a audio system, a navigation system, and an air conditioner. The function selection section selects at least one function from the functions based on the intention determined by the intention determination section, and outputs an instruction signal for controlling the selected function to the function control section.

With this configuration, the vehicle control unit can assume an intention of the user based on the determined movement or condition of the user even when the user does not perform operation related to the function. The vehicle control unit can perform control of the vehicle or devices installed in the vehicle based on the assumed intention in such a case. Namely, the vehicle control unit is capable of controlling a number of functions installed in a vehicle without decreasing the operability of the vehicle.

The present invention has another objective to provide a vehicle control system having the above-described vehicle control unit. The system includes the vehicle control unit, a user detection section, and a condition detection section. The user detection section performs user movement and condition detection, and the condition detection means detects vehicle and surrounding conditions. With this system, the vehicle and the onboard devices are properly controlled in response to the user's intention without decreasing the operability of the vehicle.

BRIEF DESCRIPTION OF THE DRAWINGS

The above and other objectives, features and advantages of the present invention will become more apparent from the following detailed description made with reference to the accompanying drawings. In the drawings:

FIGS. 3A-3D are diagrams showing intention map data according to the first embodiment;

FIG. 4 is a diagram showing function map data according to the first embodiment;

DETAILED DESCRIPTION OF THE PREFERRED EMBODIMENT

Figure 1:
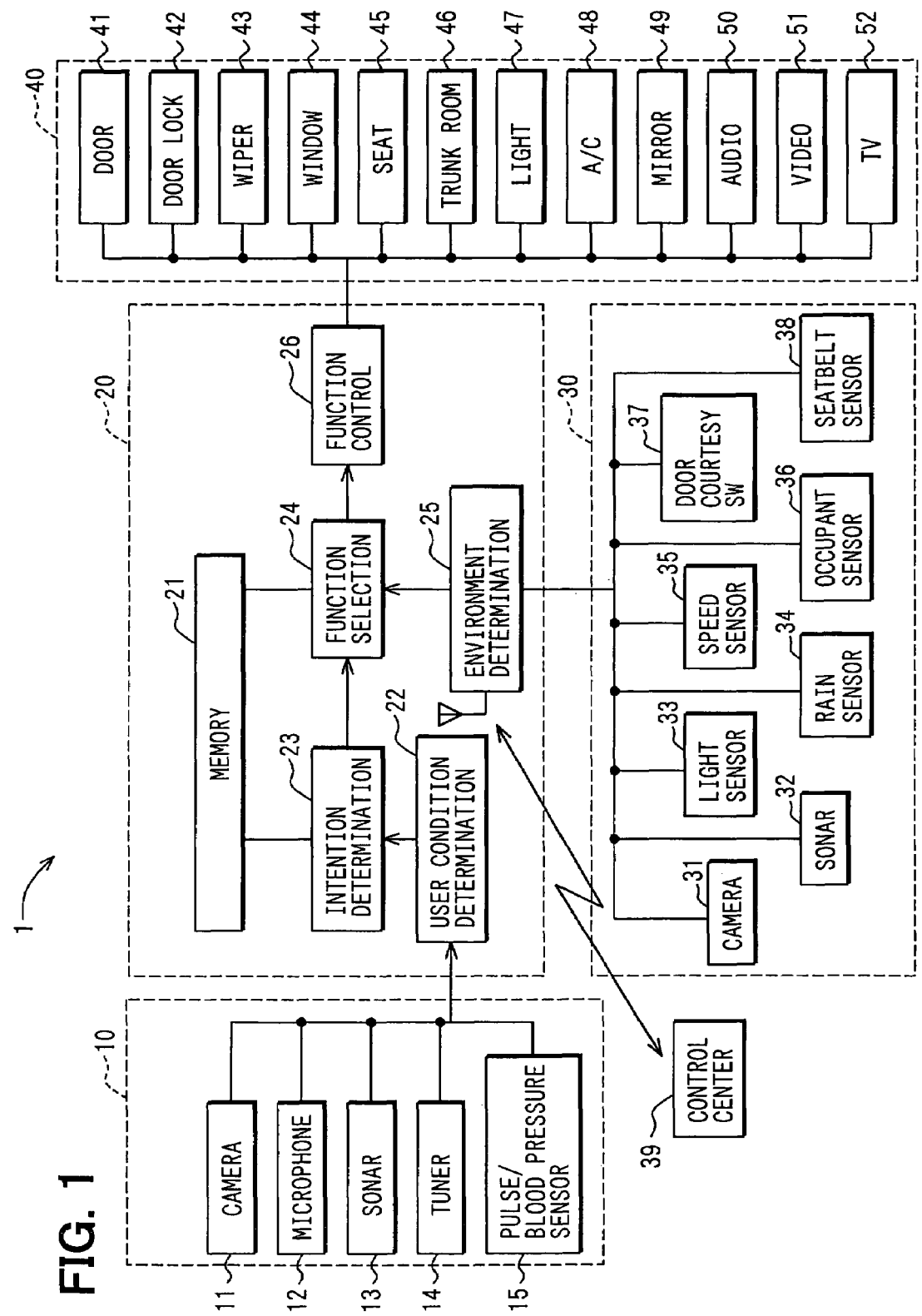
FIG. 1 is a block diagram of a vehicle control system according to the first embodiment of the present invention.

The preferred embodiments of the present invention will be explained with reference to the accompanying drawings. In the drawings, the same numerals are used for the same components and devices.

First Embodiment

Referring to FIG. 1, a vehicular control system 1 includes a detection section 10, a vehicle control unit 20, a sensor section 30, and a function section 40. The detection section 10 obtains information for determining movements and conditions of a driver from light, sound waves, and radio waves. The detection section 10 includes a camera 11 that captures images, a microphone 12 that captures voices, a sonar 13, a tuner 14, and a pulse and blood pressure sensor 15.

The camera 11, the microphone 12, the sonar 13, and the tuner 14 are installed in the vehicle so that the inside and the outside of the vehicle are scanned. They are arranged in adequate positions to have 360 degrees of a sensing area around the vehicle for the outside of the vehicle. For example, the camera 11 may be mounted to an edge of a roof or around a pillar.

The camera 11 captures images of the driver. If an infrared camera is used, it detects temperatures of the driver. The microphone 12 captures voices of the driver. The sonar 13 emits sound waves to the driver and detects reflected waves from the driver. The tuner 14 detects radio waves outputted from an electronic key of the driver. The radio waves include identification (ID) code signals outputted from the electronic key that is called a smart key or a smart card key.

The pulse/blood pressure sensor 15 measures pulses and blood pressures of the driver. The pulse/blood pressure sensor 15 is arranged at an adequate position so that it touches the driver's body. The pulse/blood pressure sensor 15 may be a wristband type sensor. With this sensor 15, physical conditions and emotional conditions of the driver can be determined. The results of detection performed in the detection section 10 are outputted to the vehicle control unit 20.

The control section 20 is an electronic control unit having a microcomputer, a RAM, and a ROM. The control section 20 has a memory section 21, a driver condition determination section 22, an intention determination section 23, a function selection section 24, an environment determination section 25, and a function control section 26.

The memory section 21 stores intention map data (first data) and function map data (second data). The memory section 21 may be configured with an EPROM or an EEPROM. The intention map data indicates correlations between drive's movements and conditions and driver's intentions, the function map data indicates correlations between the drive's intentions and the functions of the function section 40.

The driver condition determination section 22 determines movements and conditions of the driver. It receives the detection results from the detection section 10. It processed the detection results and the determines the movements and the conditions of the driver based on the processed detection results. It determines the movements and the conditions of the driver shown in columns of drawings of the intention map data shown in FIGS. 3A through 3D.

The driver condition determination section 22 recognizes the driver or determines a movement, a gesture, a facial expression, or a condition of the driver based on an image of the driver's face captured by the camera 11. For example, it determines a position shift, an arm movement of the driver, a facial movement, such as blinking, an eye movement, and yawning, facial complexion, and a temperature of the driver.

The driver condition determination section 22 determines an emotion and an instruction of the driver based on a use's voice captured by the microphone 12. It determines a position, a movement, and a gesture of the driver based on the reflected wave detected by the sonar 13. It recognizes the driver based on an electronic code detected by the turner 14. It determines a physical condition of the driver and an emotion of the driver, such as an excited condition, based on a pulse rate, blood pressures, a temperature, and facial complexion detected by the pulse/blood pressure sensor 15.

It can detects fatigue levels based on an operating time determined by the camera 11 or an operation determination section (not shown). For example, it determines a higher level of fatigue if the operation time is long. It outputs results of the determination indicating the movements and the conditions of the driver to the intention determination section 23.

The intention determination section 23 determines driver's intention. It reads the intention map from the memory section 21, and determines based on the determination results from the driver condition determination section 22 and the intention map data. It outputs results of the intention determination to the function selection section 24.

The environment determination section 25 receives the detection results from the sensor section 30. It determines environment conditions of the vehicle based on the detection results. The environment conditions include an operating condition of the vehicle, such as driving and a stop, traffic conditions around the vehicle, surrounding conditions around the vehicle, such as an existence of an object and weather. It outputs results of the environment condition determination to the function selection section 24.

The function selection section 24 selects a function to be activate from the functions in the function section 40 based on the results of the environment condition determination. It performs the selection based on the function map data read from the memory section 21 and the results of the environment condition determination. It outputs results of the selection to the function control section 26. It controls each function of the function section 40 based on the results of the selection inputted from the function selection section 24.

The sensor section 30 obtains information used for determining the vehicle conditions and the surrounding conditions. It includes a camera 31 for capturing images, a sonar 32, a light sensor 33, a rain sensor 34, a speed sensor 35, an occupant sensor 36, a door courtesy switch 37, and a seatbelt sensor 38. The camera 31 and the sonar 32 are installed in the vehicle so that the inside and the outside of the vehicle are scanned.

The environment determination section 25 determines the traffic conditions, or detects an object or a position of the driver based on the information obtained by the camera 31 or the sonar 32. The camera 11 and the sonar 13 may be used for performing such determination and detection.

The light sensor 33 detects brightness inside and outside the vehicle. The rain sensor 34 determines whether it rains. The speed sensor 35 determines whether the vehicle is moving. The occupant sensor 36 detects a position of the driver inside the vehicle. The door courtesy switch 37 detects an open or a closure of a door. The seatbelt sensor 38 whether a seatbelt is fastened.

The function section 40 includes various kinds of functions installed in the vehicle, except for functions related to driving the vehicle, such as moving, braking, and turning. Namely, the functions are related to body electronics of the vehicle, including a door 41, a door lock 42, a wiper 43, a window 44, a seat 45, a trunk room 46, a light 47, an air conditioner 48, a mirror 49, an audio system 50, a video 51, and a TV 52. However, the functions related to driving the vehicle can be included in the function section 40.

Operation of each function of the function sections 40 are referred to as follows: opening and closing the door 41, lock and unlock of the door lock 42, turning on and off the wiper 43, rolling down and up the window 44, moving positions of the seat 45, opening and closing the trunk room 46, turning on and off the light 47, turning on and off the air conditioner 48, adjusting temperature settings and air volume of the air conditioner 48, adjusting angles of the mirror 49, selecting music and adjusting volumes of the audio system 50, and selecting images and adjusting volumes of the video 51 and the TV 52. The light 47 includes headlights, taillights, hazard flashers, lights for lighting a seat.

Power is supplied to the detection section 10, the vehicle control unit 20, the sensor section 30, and the function section 40 by a battery (not shown). Power is intermittently supplied to those sections 10-40 by the battery in cases that they starts operating before an engine is started.

Figure 2:
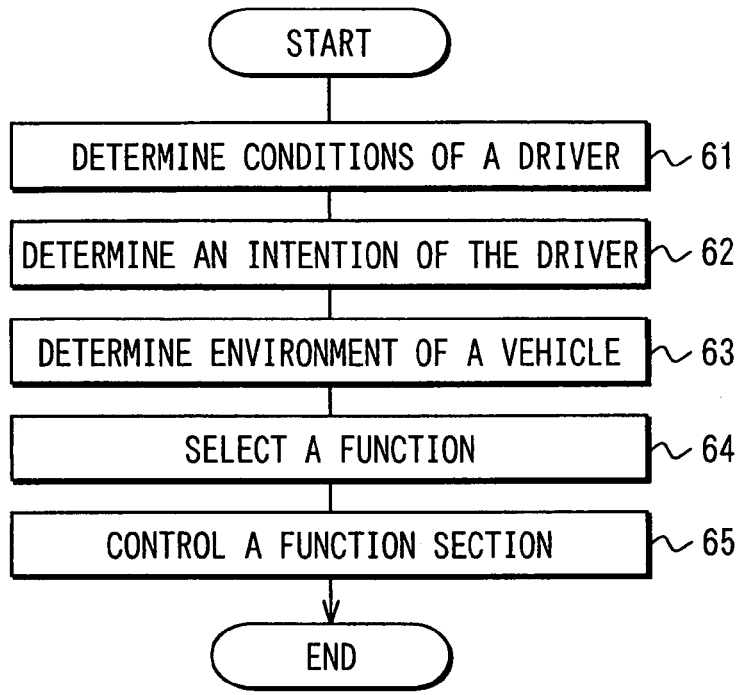
FIG. 2 is a flowchart of a control process performed by a vehicle control unit included in the vehicle control system according to the first embodiment.

Operation of the vehicle control system 1 will be discussed. FIG. 2 is a flowchart of a control process performed by the vehicle control unit 20 for controlling the functions of the function section 40. This process is started with time interruption of 0.01 to 0.1 seconds.

The detection section 10 obtains the information used for recognition of the driver and the determination of movements and conditions of the driver (S61). For example, the camera 11 captures images of the driver, or the microphone 12 captures voices of the driver. The information is inputted from the detection section 10 to the driver condition determination section 22. The driver condition determination section 22 determines movements and conditions of the driver based on the information. It outputs results of the determination to the intention determination section 23.

The intention determination section 23 determines driver's intention (S62). It performs the determination based on the intention determination results inputted from the intention determination section 23 and the intention map data read from the memory section 21.

The environment determination section 25 determines an environment of the vehicle, including vehicle conditions and surrounding conditions (S63). It performs the environment determination based on the outputs of the sensor section 30. The vehicle conditions and the surrounding conditions are important factors for determining driver's intention. For example, information on whether it is raining is necessary when the function selection section 24 determines whether operation of the wiper 43 is necessary because the operation of the wire 43 is not necessary if it is not raining.

The environment determination section 25 determines whether it is raining based on the outputs of the rain sensor 34. In this case, it determines the amount of rainfall. It determines an operation speed of the wiper 43 based on the amount of rainfall. It determines the environment of the vehicle so that the function selection section 24 can determine control of the functions proper for the environment of the vehicle. It outputs results of the environment determination to the function selection section 24.

The function selection section 24 selects a function of the function sections 40 most suitable for the driver's intention determined by the intention determination section 23 (S64). It reads the function map data from the memory section 21 and selects the function based on the function map data. It also refers to the results of the environment determination inputted from the environment determination section 25. It outputs an instruction signal for executing control for the selected function to the function control section 26. The function control section 26 controls the function section 40 according to the instruction from the function selection section 24 (S65).

The intention map data and the function map data will be discussed referring to FIGS. 3A-4. The first, the second, the third, and the fourth intention map data shown in FIGS. 3A-3Dcontains multiple maps grouped under "driver's operation," "driver's movement," "driver's gesture," and "driver's physical and emotional conditions," respectively.

Each map has the first-group items related to drive's movements and conditions in a column, and second-group items related to driver's intentions in a row. The second-group items include intention-related items, and all maps have the same intention-related items in their rows, and the items cover driver's intentions of actions performed inside and outside the vehicle.

The first-group items include operation-related items, action-related items, gesture-related items, and physical and emotional condition-related items. In the first intention map data shown in FIG. 3A, the operation-related items are listed in the column. The operation-related items includes "getting in," "moving vehicle," "setting alarm," "opening door," and "unlock." These operations are directly performed by the driver.

In the second intention map data in FIG. 3B, the action-related items are listed in the column. The action-related items include "approaching from front," "approaching from rear," "bringing things," and "getting out." The actions do not include driver's operations of the functions, such as pressing an operation button and selecting an icon on a screen. The items "approaching from front" and "approaching from rear" indicate driver's actions of approaching from the front of the vehicle and approaching from the rear of the vehicle, respectively.

In the third intention map data shown in FIG. 3C, the gesture-related items are listed in the column. The gesture-related items include "looking at door," "looking at thing," and "reaching for door." In the fourth map data shown in FIG. 3D, the physical and emotional condition-related items are listed in the column. The physical and emotional condition-related items include "healthy," "good mood," "happy," and "sad." A voice instruction issued to the function section 40 may be added to the operation group or the movement group. Conversations and murmurs may be added to the gesture group or the emotional condition group. The second group items, namely, the intention-related items of each map include "unlock," "opening door," "getting in," "driving," "loading and unloading," adjusting room condition," and "setting alarm."

The operation-related items are divided into a purpose-related area and a function-related area so that functions can be selected and performed as a group for a purpose when more functions are added to the vehicle in the future. For example, the driver has to separately select functions for closing windows and locking doors when the driver sets a burglar alarm after getting out the vehicle. By grouping the functions by purposes, the driver only has to select a mode for setting burglar alarm. In this mode, the vehicle control unit 20 controls windows and locks. The operation items are divided into the purpose-related area for performing multiple functions and the function-related area for individually performing the functions to support either way.

In the fourth map data, heavy weights are assigned to the "adjusting room condition" item in the driver intention group. The vehicle control unit 20 performs driver support regardless of the physical and the emotional conditions of the driver for items of "opening door" and "getting in." However, setting air conditions, including temperature and humidity, lighting conditions, music, and information greatly depends on the physical and the emotional conditions of the driver. Namely, setting the air conditioner 48, the light 47, and a multimedia system, including the audio system 50, the TV 52, and a radio (not shown) greatly depends on the physical and the emotional conditions of the driver.

The first-group items are classified into categories according to levels of the correlations to the second-group items, and rated a scale of 1 to 5 to have specific ratings. The ratings of 1 to 5 indicates weights. Namely, the rating of 1 indicates no correlation between the first-group items and the second-group items, and the ratings of 2 to 5 indicates the levels of correlations between the first-group items and the second-group. Priority levels used for selecting a function based on driver's intention are determined according to the scale. More specifically, the priority levels are determined such that they become higher as the values become larger, and the second-group items that the driver has higher intention has higher priority levels.

The scale is not limited to five levels, or the correlations may be indicated with yes or no. For example, the numbers shown in FIGS. 3A-3D are replaced with "yes" if correlations exist between the action-related items and the intention-related items, and with "no" if correlations do not exist between the action-related items and the intention-related items.

The weights are assigned based on basic assumption of the priority levels. However, the priority levels may be differently set depending on the operations, the movements, and the gestures of a driver. To make it possible, the vehicle control unit 20 is configured so that a driver can alter default settings of the weight assignment at a purchase of a vehicle according to his or her preferences.

Different values indicating different priority levels are assigned to the same items in different maps so that differences are clearly recognizable when comparison between the maps are performed. For example, the priority levels of "unlock" decreases in order of the first map data, the second map data, the third map data, and the fourth map data. The priority level of "unlock" in the first map data is the highest because the operation item corresponding to an unlock operation of the driver is considered as a clear indication of driver's intention to unlock.

Driver's direct indication of intention shows up as some kind of operation, and driver's indication of a certain level of intention shows up as some kind of action. Driver's gestures are usually less associated with his or her intention, and driver's physical and the emotional conditions are still less associated with his or her intention. Therefore, the priority levels are set in that order.

In the function map data, each intention-related item is linked to one or more function-related items corresponding to functions of the function section 40. The intention-related items are classified into categories according to levels of the correlations to the function-related items, and rated on a scale of 1 to 5 in the same manner as the intention map data. The ratings of 1 to 5 indicates weights. The scale is not limited to five levels, or the correlations may be indicated with yes or no.

More specifically, the intention-related items are listed in a column as shown in FIG. 4. The intention-related items include "unlock," "opening door," "getting in," "driving," "loading and unloading," "adjusting room condition," and "setting alarm." The third-group Items related to functions of the function section 40, namely, the function-related items are listed in a row. The function-related items include "light (illumination)," "wiper," "window," "door," "door lock," "air conditioner," "audio system," and "seat." Only names of the functions are shown in FIG. 4. However, a series of operations for activating the functions are actually specified and linked to each function-related item. For example, turning on and off the light is specified and linked to the item of "light."

The intention determination section 23 compares the results of the driver condition determination with the intention map data, and extracts the weights assigned to the items corresponding to the results from the intention map data. It extracts multiple numbers of the weights if the multiple numbers of the items of the movements and the conditions of the driver are provided. In this case, the intention determination section 23 multiplies the weights for each intention-related item. It compares the extracted weight or the multiplied weight value with a threshold. It determines that the intention-related item as an actual driver's intention if the extracted weight or the multiplied weight value is larger than the threshold.

The intention determination section 23 may be configured to determine driver's intentions by different method. For example, it may take the certain number of intention-related items in an order of the extracted weights or the multiplied weight values from the largest extracted weight or the largest multiplied weight value, and determines the intention-related items as an actual driver's intention. Alternatively, it may determine the intention-related item having the largest multiplied weight value as actual driver's intention. If multiple intention-related items having the largest multiplied weight value exist, it determines the superiority based on the priority levels and kinds of maps in which the priority levels are indicated.

The importance is different from map to map. Thus, the intention determination section 23 can determine the superiority based on the priority levels indicated in the map, the importance of which is high. For example, the map related to the operation shown in FIG. 3A has higher importance than the map related to the physical and the emotional condition shown in FIG. 3$d$. Therefore, the intention determination section 23 can determine the superiority through comparison between the priority levels within this map.

Furthermore, the intention determination section 23 can determine based on the priority levels that are multiplied. If the multiplied weight value is 16, it may be calculated by multiplying two priority levels of 4 or by multiplying four priority levels of 2. The intention determination section 23 can determine the intention-related item, the multiplied weight value of which is calculated by multiplying two priority levels of 4, as an actual driver's intention. A weight value may be calculated by adding multiple priority levels instead of multiplying.

The process of the determination of the driver's intention will be discussed in detail using an example. In this example, the driver approaches the vehicle from the front and gets in the vehicle. The driver condition determination section 22 determines that the driver is "approaching from front" and "looking at door" based on images received from the camera 11 when the driver approaches from the front and looks at a drive's door. The intention determination section 23 refers to the intention map data for the information of "approaching from front and "looking at door".

The weights of the intention-related items "unlock," "opening door," "getting in," "driving," and "loading/unloading" in the case of "approaching from front" are 4, 4, 4, 4, and 2, respectively. The weights of the intention-related items "unlock," "opening door," "getting in," "driving," and "loading/unloading" in the case of "looking at door" are 3, 3, 2, 1, and 1, respectively. The multiplied weight values of the intention-related items "unlock," "opening door," "getting in," "driving," and "loading/unloading" are 12, 12, 8, 4, 2, respectively.

If the threshold is 5, the intention determination section 23 determines that "unlock," "opening door," and "getting in,"

the multiplied weight values of which are larger than the threshold, are an actual driver's intention. The reason why the threshold is set to 5 is that one of the function is immediately activated if the function is operated by the driver. However, the threshold is not limited to 5, and it can be set to other values.

A process performed by the function selection section 24 in step S64 for selecting functions of the function section 40 will be discussed. In step S64, the function selection section 24 refers to the function map data for the driver's intention determined by the intention determination section 23, and selects functions assigned to the intention-related items corresponding to the determined driver's intention. It selects multiple functions at a time if multiple intention-related items are assigned to a single intention-related item in the function map data.

If the weights of the function-related items are different, the function selection section 24 selects the function-related item having the largest weight. In the case that the driver's intention of "getting in" is determined by the intention determination section 23, possible functions to be selected are "light," "door," "door lock," "air conditioner," "audio system," and "seat." The weight of "air conditioner" is 3 and the weights of the other functions are 4. Therefore, the function selection section 24 selects the functions "light," "door," "door lock," "audio system," and "seat."

The function selection section 24 selects the function "light" because it is assumed that the driver usually has intentions to check a crossrail position, a seat position, and an object on a seat when the inside of the vehicle is dark. Namely, selecting the function "light" actually means selecting a function for lighting the crossrail and the seat. The function selection section 24 selects the function "seat" because a driver's seat position is different from driver to driver if multiple drivers share the vehicle. Namely, selecting the function "seat" actually means selecting a function for shifting the driver's seat position for the driver at that time. The function selection section 24 selects the functions "air conditioner" and "audio system" for adjusting the environment of the inside of the vehicle to the driver's preference.

With the above-described configuration, the vehicle control unit 20 can assume driver's intention based on movements and conditions of the driver even when the driver does not perform operation corresponding to the functions. Thus, the vehicle control unit 20 can control the function section 40 based on the assumed driver's intention. Namely, the vehicle control unit 20 can control the function section 40 based on the driver's intention when the driver does not directly operate the functions of the function section 40. As a result, operability of the vehicle will not decrease even when a number of functions are installed in the vehicle, that is, the vehicle can have advanced functions while the number of operations that the driver needs to perform is reduced.

The driver's intention assumed based on the movements, the gestures, and the physical and the emotional conditions may not be an actual driver's intention. It is difficult to assume an actual driver's intention based on a single movement, gesture, physical condition, or emotional condition, and several kinds of driver's intentions are assumed. Therefore, the intention determination section 23 refers to the intention map data for several movements and conditions of the driver, and multiplies the weights assigned to the intention-related items corresponding the movements and the conditions of the driver. As a result, the certainty of the driver's intention assumed by the intention determination section 23 is increased in comparison with that of the driver's intention assumed based on a single movement, gesture, physical condition, or emotional condition.

The function selection section 24 selects the functions of the function section 40 by referring the function map data for the results of the intention determination performed by the intention determination section 23. If multiple function-related items are assigned to a single intention-related item, the function selection section 24 selects one of the function-related item having a large weight. Therefore, the functions selected by the function selection section 24 closely correspond to an actual driver's intention.

The function selection section 24 selects the functions of the function section 40 in consideration of the results of the environment determination performed by the environment determination section 25. Thus, the function selection section 24 can determine whether the control of the functions is proper based on the vehicle conditions, and can perform the control of the functions proper for the driver's intention.

Second Embodiment

Figure 5:
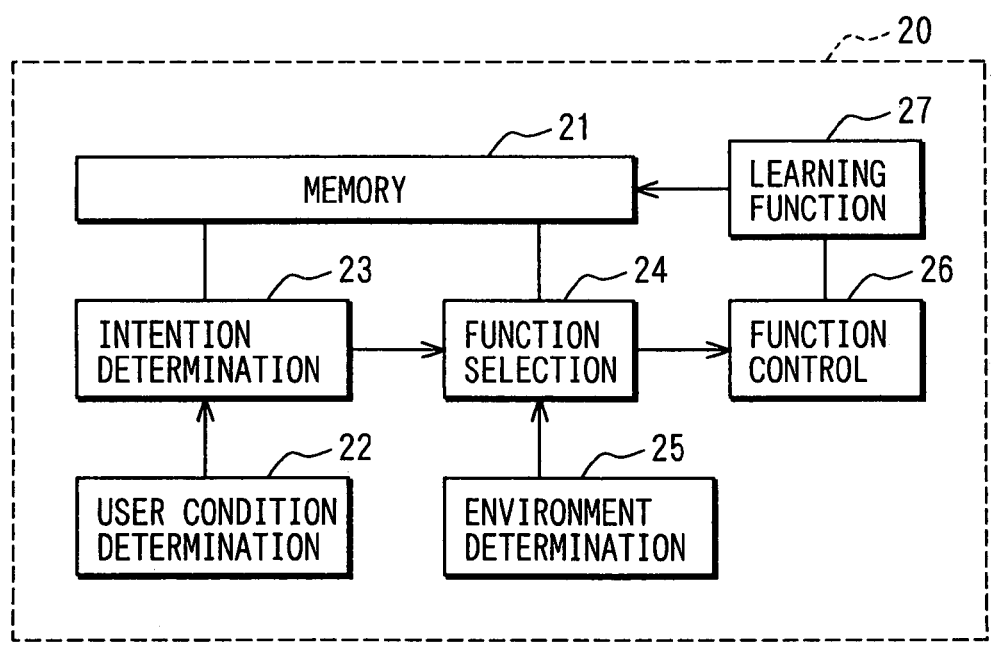
FIG. 5 is a block diagram of a vehicle control unit according to the second embodiment of the present invention.

Referring to FIG. 5, the vehicle control unit 20 further includes a learning function section 27, which is an alteration section. The control of the function section 40 performed by the function control section 26 may conflict with the operation of the function section 40 directly performed by the driver or the movement of the driver other than the operation. In such a case, the learning function section 27 alters the weights in the function map data stored in the memory section 21. The functions of the function section 40 are assigned for the intention-related items corresponding to the intention assumed by the intention determination section 23 based on a correlation between the intention and an expected effect of the function section 40. Namely, the functions are assigned in the function map data such that the most appropriate functions are performed in complying with intentions of a regular driver.

However, the driver may feel that the functions in the function map data are not assigned to match his or her preference while the driver uses this vehicle control system 1. Therefore, the learning function section 27 is provided for altering the settings in the function map data through a learning process performed by the learning function section 27.

The learning process will be discussed referring to a flowchart shown in FIG. 6. This process is started every time when the control of the function section is performed by the function control section 26.

The learning function section 27 determines whether the driver has performed operation that conflicts with the control of the function section 40 performed by the function control section 26 (S71). For example, the driver aborts operation of a function immediately after the function is selected by the function control section 26. In this case, the learning function section 27 determines the conflict. Another example is that the driver directly performs operation of a function specified in the intention map data immediately after the function is selected by the function control section 26, and selects another function having a lower priority level set in the function map data. In this case, the learning function section 27 also determines the conflict. Moreover, the learning function section 27 determines the conflict when the driver make a specific gesture or movement, such as saying "no." If the driver turns off or slows down the wiper 43 immediately after the function control section 26 turns on the wiper 43, the driver's action or operation is determined as conflicting operation.

If the learning function section 27 determines that the driver has not performed operation that conflicts with the control of the function section 40, that is, the result of step S71 is no, it terminates the learning process. It terminates the learning process because proper control of the function section 40 performed by the function control section 26 is determined. If the result of step S71 is yes, the learning function section 27 performs the next step.

Figures 6, 7:
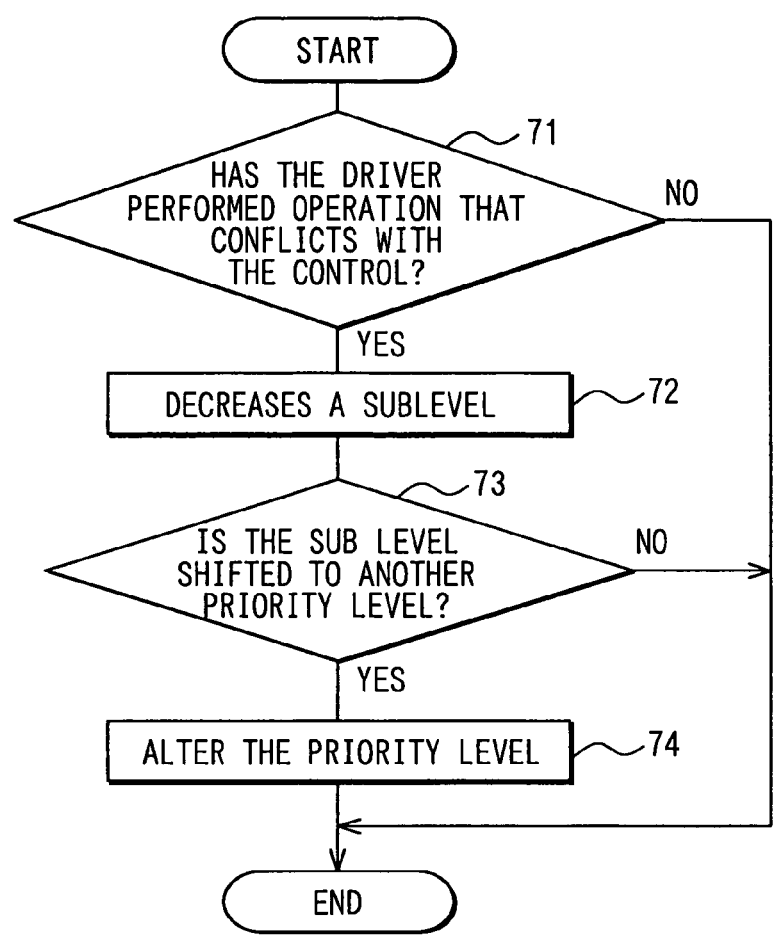
FIG. 6 is a flowchart of a learning process performed by a learning function section of the vehicle control unit according to the second embodiment.
FIG. 7 is a diagram showing a learning process performed by the learning function section according to the second embodiment.

Each priority level has sublevels as shown in FIG. 7. The learning function section 27 decreases a sublevel within the set priority level of the function selected by the function selection section 24 by one level in the function map data (S72). If the driver directly performs operation of the function, the leaning function section 27 raises the sublevel by one level within the set priority level. The sublevels are set with a scale of 1 to 5 within each priority level. The sublevel within a set priority level of the selected function is shifted to a sublevel of the different priority level when the current sublevel is at the highest or the lowest level within the current priority level.

The learning function section 27 determines whether the sublevel is shifted to a sublevel of another priority level (S73). If a result of the determination is no, it terminates the learning process without altering the priority level. If, the result is yes, it performs the next step. It alters the priority level within the function map data stored in the memory section 21 (S74). It continually updates the function map data. With this process, a level of matching between the driver's intentions and the functions is increased.

If the driver slows down a speed of the wiper 43 immediately after the function control section 26 starts controlling the wiper 43 to operate at a speed determined by the function selection section 24 based on a rain sensor output, the control of the control unit 20 is considered to be improper for the driver's intention. The control unit 20 can control the wiper 43 next time when it receives the same rain sensor output to operate at a speed that the driver set for the rain sensor output through the learning process performed by the learning function section 27.

If the operation conflicts with the function, the control unit 20 alters the sublevel before altering the priority level so that a decrease in the usability due to driver's erroneous operation is less likely to occur. However, the control unit 20 can be configured so the alteration of the priority level can be made immediately after the conflict is determined. It may be configured so that the altered sublevel is reset to the original level within the priority level if the conflicts between the selected functions and the driver's operation does not occur for the specific consecutive numbers of times.

Furthermore, the driver may want to reset the priority level to the previous level. To make it possible, a reset section having reset functions for the learning function section 27 may be added to the control unit 20, or correlations, or functions for resetting in correlation with specific gestures or actions of the driver.

The learning function section 27 may be configured to perform the same learning process for the intention map data as for the function map data. In the process, the learning function section 27 altars the priority level of the intention-related item if the driver performs the movement or the operation that conflicts the determined intention. Five sublevels are set in each priority level, and the priority level is adjusted by adjusting the sublevels. With this configuration, default conditions of the intention map data and the function map data can be registered in the memory section 21, and a level of matching between the driver's intentions and the functions is further increased through the learning process.

The present invention should not be limited to the embodiment previously discussed and shown in the figures, but may be implemented in various ways without departing from the spirit of the invention. For example, a unit that is not installed in the vehicle, such as a portable unit including a cellular phone, may be used for the detection section 10. In this case, information about positions and conditions of the driver can be obtained through the portable unit. Correlations set in the intention map data an the function map data The vehicle control unit 20 may control the function section 40 while the vehicle is moving. For example, the driver may want to operate the air conditioner 48 or the audio system 50. In this case, the intention map data may contain intention-related items related to driver's movement of operating the air conditioner 48 or the audio system 50, such as reaching out his or her hand to the air conditioner 48 or the audio system 50. The driver condition determination section 22 identifies a movement of the driver's hand and determines that the driver has an intention to operate the air conditioner 48 or the audio system 50. The function selection section 24 selects the air conditioner 48 or the audio system 50 and the function control section 26 starts control of the air conditioner or the audio system 50.

The use may want to turn on the wiper 43 while the vehicle is moving. In this case, the intention map data may contain intention-related items related to driver's gesture of looking at the wiper 43.

The vehicle control unit 20 may determine intentions of passengers of a vehicle and control the functions in the same manner as the driver's case. The intention determination section 23 may determine that a passenger has an intention to roll down the window 44 if the passenger is a child and the child happens to roll down the window 44. The vehicle control unit 20 can be configured so that the function selection section 24 does not select a function for rolling down the window 44 when the environment determination section 25 has determined that the vehicle is traveling on a freeway.

The intention map data and the function map data may be prepared for each driver or passenger and stored in the memory section 21 if several people use the vehicle. People usually have different preference. Therefore, it is preferable to prepare the intention map data and the function map data for each driver or passenger based on the preference. Sets of the intention map data and sets of the function map data can be switched for the driver or the passenger recognized by the user condition determination section 22 based on information obtained through the camera 11, the microphone 12, and the turner 14.

If a family of five uses the vehicle, five sets of the intention map data and five sets of the function map data may be prepared. The intention determination section 23 first performs recognition of a member of the family. Then, the intention determination section 23 and the function determination section 24 uses respective sets of the intention map data and the function map data for the member.

The sections 22-26 may be included in different ECUs. The vehicle control unit 20 may be configured without the function control section 26. In this case, a control section for controlling the function section 40 is connected between the vehicle control unit 20 and the function section 40, and the vehicle control unit 20 outputs results of function selection from the function selection section to the control section. The control section can control the function section 40 in such a way.

A control center 39 shown in FIG. 1 can perform functions of the environment determination section 25. The control center 39 manages information on traffic, whether, and roads, and the environment determination section 25 can obtain the information from the control center 39 via a communication systems, such as a radio communication system. Then, the environment determination section 25 determines surrounding conditions around the vehicle, including traffic, road, and whether conditions based on the information received via a receiver installed in the vehicle. The sensor sections 30 may be used together with the control center 39 for the environmental determination.

What is claimed is:

1. A vehicle control unit comprising:
   memory means that stores a first data that indicates a correlation between a movement and a condition of a user and an intention of the user;
   user condition determination means that determines a movement and a condition of the user based on a result of movement and condition detection performed by user detection means;
   intention determination means that determines an intention of the user based on the first data and the result of the movement and condition determination;
   function control means that controls a plurality of functions installed in a vehicle; and
   function selection means that selects at least one function from the plurality of functions based on the intention determined by the intention determination means, and outputs an instruction signal for controlling the selected function to the function control means.

2. The vehicle control unit according to claim 1, wherein the intention determination means determines an intention of the user based on the first data and a plurality of results of the movement and condition determination when the plurality of results are provided by the user condition determination means.

3. The vehicle control unit according to claim 2, wherein; the first data contains first-group items and second-group items;
   the first-group items are related to movements and conditions of the user;
   the second-group items are related to intentions of the user;
   the first data indicates correlations between the first-group items and the second-group items;
   the intention determination means refers to the first data, and selects the second-group items that have correlations to the first-group items that correspond to the results of the movement and condition determination; and
   the intention determination means determines an intention of the user based on the selected second-group items.

4. The vehicle control unit according to claim 3, wherein:
   the first-group items are classified into categories according to levels of the correlations to the second-group items;
   the categories are marked with different priority levels; and
   the intention determination means selects the second-group items with reference to the priority levels, and determines an intention of the user based on the selected second-group items.

5. The vehicle control unit according to claim 3, wherein:
   the first-group items are rated on a scale that is determined according to levels of the correlations to the second-group items to have specific ratings; and
   the intention determination means selects the second-group items with reference to the ratings, and determines an intention of the user based on the selected second-group items.

6. The vehicle control unit according to claim 5, further comprising alteration means that alters the ratings based on an operation performed by the user for controlling one of the plurality of functions when the operation conflicts with control of the selected function performed by the function control means.

7. The vehicle control unit according to claim 5, further comprising alteration means that alters the ratings based on an operation of the user when the operation conflicts with control of the selected function performed by the function control means.

8. The vehicle control unit according to claim 1, wherein:
   the memory means further stores a second data that indicates correlations between the plurality of functions and intentions of the user;
   the function selection means selects at least one function from the plurality of functions based on the intention determined by the intention determination means and the second data.

9. The vehicle control unit according to claim 8, wherein:
   the second data contains the second-group items and third-group items;
   the third-group items are related to the functions of the plurality of functions;
   the second data indicates correlations between the second-group items and the third-group items;
   the second-group items are classified into categories according to levels of the correlations to the third-group items;
   the function selection means refers to the second data, and selects the third-group items that have correlations to the second-group items that correspond to the intention determined by the intention determination means; and
   the function selection means selects a function from the plurality of the functions based on the selected third-group items.

10. The vehicle control unit according to claim 9, further comprising alteration means that alters the ratings based on an operation performed by the user for controlling one of the plurality of functions when the operation conflicts with control of the selected function performed by the function control means.

11. The vehicle control unit according to claim 9, further comprising alteration means that alters the ratings based on an operation of the user when the operation conflicts with control of the selected function performed by the function control means.

12. The vehicle control unit according to claim 1, further comprising environment determination means that determines an environment of the vehicle based on an output of condition detecting means that detects vehicle and surrounding conditions, wherein the function selection means selects the function with reference to the determined environment.

13. The vehicle control unit according to claim 12, wherein the environment determination section further determines a position of the user.

14. The vehicle control unit according to claim 12, wherein the vehicle and surrounding conditions include driving conditions, traffic conditions, road conditions, and weather conditions.

15. A vehicle control system comprising:

a vehicle control unit having memory means that stores a first data that indicates a correlation between a movement and a condition of a user and an intention of the user, user condition determination means that determines a movement and a condition of the user based on a result of movement and condition determination performed by detection means, intention determination means that determines an intention of the user based on the first data and the result of the movement and condition determination, function control means that controls a plurality of functions installed in a vehicle, and function selection means that selects at least one function from the plurality of functions based on the intention determined by the intention determination means, and outputs an instruction signal for controlling the selected function to the function control means;

user detection means that performs user movement and condition detection; and condition detection means that detects vehicle and surrounding conditions.

16. The vehicle control system according to claim 15, wherein the user detection means includes at least one of image capturing means and voice capturing means.

17. The vehicle control system according to claim 15, wherein the condition detection means includes at least image capturing means.

* * * * *